US007024592B1

United States Patent
Voas et al.

(10) Patent No.: US 7,024,592 B1
(45) Date of Patent: Apr. 4, 2006

(54) METHOD FOR REDUCING CATASTROPHIC FAILURES IN CONTINUOUSLY OPERATING SOFTWARE SYSTEMS

(75) Inventors: Jeffrey M. Voas, Herndon, VA (US); Frank Charron, Leesburg, VA (US)

(73) Assignee: Cigital, Dulles, VA (US)

( * ) Notice: Subject to any disclaimer, the term of this patent is extended or adjusted under 35 U.S.C. 154(b) by 636 days.

(21) Appl. No.: 09/922,650

(22) Filed: Aug. 7, 2001

Related U.S. Application Data

(60) Provisional application No. 60/223,435, filed on Aug. 7, 2000.

(51) Int. Cl.
*G06F 11/00* (2006.01)

(52) U.S. Cl. .......................................... 714/47; 717/124
(58) Field of Classification Search ................... 714/47, 714/38, 37, 39, 48, 45; 717/124, 127, 128, 717/131, 135, 141, 126, 129, 4, 8
See application file for complete search history.

(56) References Cited

U.S. PATENT DOCUMENTS

| | | | | |
|---|---|---|---|---|
| 5,513,315 | A | * 4/1996 | Tierney et al. | 714/37 |
| 5,671,352 | A | * 9/1997 | Subrahmaniam et al. | 714/41 |
| 5,758,061 | A | * 5/1998 | Plum | 714/35 |
| 6,161,196 | A | * 12/2000 | Tsai | 714/10 |
| 6,301,701 | B1 | * 10/2001 | Walker et al. | 717/125 |
| 6,477,666 | B1 | * 11/2002 | Sanchez et al. | 714/41 |
| 6,484,276 | B1 | * 11/2002 | Singh et al. | 714/41 |
| 6,539,503 | B1 | * 3/2003 | Walker | 714/703 |

OTHER PUBLICATIONS

Voas et al., Predicting How badly "Good" Software can behave, 1997, IEEE Software, 14(4) 73–83.*
Voas et al., Software testability measurement for assertion placement and fault localization, AADEBUG 1995: 133–144.*
Jeffrey Voas, Building software recovery assertions from a fault injection–based propagation analysis, COMPSAC, 1997, 505–510.*

* cited by examiner

*Primary Examiner*—Nadeem Iqbal
(74) *Attorney, Agent, or Firm*—Pillsbury Winthrop Shaw Pittman LLP

(57) ABSTRACT

A method for assessing how long continuously operating software systems can be expected to remain executing in a safe and/or reliable manner before anomalous conditions will ultimately lead to failure. For safety-critical applications the method can provide a safe upper bound on the time between rebooting. Also disclosed is an empirical technique for determining which portions of the state, if corrupted create the greatest risks to safe and/or reliable continual execution of the software. Armed with this information, developers, testers, and certifiers can create justifiable plans for the frequency with which the software should be rebooted. Further, they can customize and embed internal self-tests into those portions of the state found to have the greatest risks to safe and/or reliable, continual execution of the software. These self-tests can also warn when failures are likely to occur well in advance of the failures, so that the software may be safely rejuvenated to avert undesired or catastrophic conclusions.

13 Claims, 5 Drawing Sheets

METHOD FOR REDUCING CATASTROPHIC FAILURES IN CONTINUOUSLY OPERATING SOFTWARE SYSTEMS

This application claims the benefit of U.S. Provisional application No. 60/223,435 filed Aug. 7, 2000, which is herein incorporated by reference in its entirety.

BACKGROUND

FIELD OF THE INVENTION

The present invention relates to the field of software testing, and, in particular, the present invention provides a system and method for testing and predicting software reliability.

BACKGROUND OF THE INVENTION

Many hardware and software systems are operated for relatively short periods time. That is, they are started up (booted) and used to perform one or more tasks and when the task or tasks have been completed, the systems are shutdown until the next time the tasks need to be performed. There are however, many software systems, e.g., database and web servers and embedded control software, that operate continuously. Such systems generally begin executing from a set of initial conditions when upon boot up and continue executing according to state information calculated from earlier software executions. FIG. 1A illustrates a basic control system that is supervised by continuously running software (illustrated by Control Software 120).

As illustrated in FIG. 1A, the continuously running software is typically comprised of two parts, an initialization sequence (Initialization 121) and a control loop (Control Loop 122). Control Software 120 may be traditional "embedded software" and System 100 may be some machine or other physical device. Similarly, Control Software 120 may be an operating system or an application running on some hardware platform and System 100 may be another application on the same or different hardware platform. In either case, Control Software 120 receives input from System 100 and provides output to System 100 based on the inputs as described below.

Initialization 121 represents instructions (code) which are executed at the time the program is first run. After initialization, internal data is in a predefined, stable state. Control Loop 122 iterates continuously, collecting new Inputs 110 from System 100, and computing new Outputs 130 which are fed back into System 100. New output values for a given Control Loop 122 iteration are calculated from current input values and internal data states, which evolve as a function of previous input values and control parameters. Outputs 130 produced for a given Control Loop 122 iteration directly impact Inputs 110 supplied by System 100 in the next iteration.

In many cases continuously operating software systems produce little external output given the amount of input received and the number of iterations performed. That is, much of the software's computation results remain as internal state information. Results that are released externally typically consist of output signals necessary to maintain the system under the software's control. Because such systems often produce little external output when compared to the amount of information they actually compute, they are more difficult to test and debug than conventional software programs.

Software testing problems for such continuously operating software systems can generally be tied to a lack of "observability." Software debugging can be simplified by increasing the amount of information a tester can glean, such as by outputting two 64-bit floating point values as opposed to one. Such actions allow a tester to observe more computations as they are processed and evaluate computation results. Having access to this additional information also provides a tester with more confidence that the software did not execute any faults during an execution in which the software did not actually fail. However, the addition of such debugging information can significantly increase the overall system resource requirements. As a result, software programmers are typically reluctant to include such information.

In addition to testing problems, software programmers face difficulties during design and specification phases. For example, in many cases it is critical to predict how often the continuously operating software system should be restarted (or rebooted) after it is deployed. Such predictions are important, as Control Loop 122 internal data states may become corrupted after a period of time. Awareness of necessary restart intervals is especially important in safety-critical embedded software in which the interval between restarts may be critical. Moreover, analysis is necessary to identify and prevent other catastrophic failures in the system which may result from degradation of the software over time.

Corruption of data states maintained within Control Loop 122 can lead to computation of erroneous outputs. Such output may result in a catastrophic failure of System 100. In addition, due to feedback inherent in the overall system, the corruption could continue to degrade the system until Control Software 120 is unable to control System 100 according to specifications.

Some in the prior art have attempted to enhance software reliability by increasing the amount of information released during testing, thereby allowing observation and evaluation of more internal (i.e., intermediate) calculations. Observability has long been a metric used in continuously operating software design to describe the degree (or ability) to which software problems can be determined based on outputs.

When observability is poor, some in the prior art have employed Built-In Self Tests (BISTs) to force complex circuits to perform self validation. BISTs involve placing hardware probes into circuits to increase the observability of a circuit running embedded software during testing. However, as previously discussed, most embedded software programmers are reluctant to implement such tests due to system resource increases they necessitate.

As an example of the potential dangers posed by corruption of control system data states, consider software built to keep a car on a pre-defined track. Corruption of internal data states could cause the controller portion of the software to yield unsafe outputs to the devices that guide the car. Moreover, over time the corruption could propagate throughout the data state and defeat the controller, ultimately leading the car off track to an unacceptable and potentially catastrophic state. This cannot be tolerated by many control systems, particularly safety-critical systems.

Another example of data state corruption actually occurred during the Gulf War. In his Aug. 15, 1991 article for the Associated Press entitled "Army Records Say Computer Shutdown Might Have Averted Scud Disaster," R. Burns reported that Army investigators had looked into the failure of a Patriot missile to shoot at an incoming Scud missile. The investigators determined that the failure was most likely caused by a previously unknown glitch in Patriot control software. Apparently, if a Patriot control computer was kept running for long periods, the control system computer clock would drift, causing the computer to lose track of an incoming missile. An Army memo indicated that researchers had discovered the problem prior to the incident, but had unintentionally mischaracterized the discovery as an improvement. The memo further stated that field technicians could have reduced the risk of such failure by rebooting the Patriot control computer more frequently.

The problems described above are not limited to continuously operating embedded software systems. Any continuously operating software system may be susceptible to failures resulting from unacceptable output due to corruption of the internal data states. For example, Web Site System 150, shown in FIG. 1B, must operate continuously responding to requests from Web Browser Clients 152. The software comprising Web Site System 150 is a complex system of software components, often running distributed over multiple machines in a Local Area Network (LAN). The software components interface with the low-level operating system 154 (OS) in order to send and receive data from a variety of devices, such as e.g., network devices and memory storage devices. Web server software 156 is a component running on top of OS 154 to provide continuous handling of HTTP requests from clients. User HTTP requests sent to the web server are passed on to the appropriate Web Application Components 158 that provide the logic to fully process the requests and generate the correct responses. Web application components may comprise components such as Enterprise Java Beans (EJB), scripts (e.g.. CGI scripts), COM components, executables, and the like. The different components frequently interface with one another, as well as with OS 154 and Web Server 156. They can also interface with Database Components 160, which represent any data storage or persistence mechanism. Database Components 160 may run on a separate server dedicated to providing data access services for the database. Typically, the interface to a database server is through a standard database server interface protocol like ODBC and database commands are performed using query languages like SQL. Finally, Web Site System 150 may interface with external servers 162 on Internet 164 that provide services such as credit card processing and other business to business (B2B) applications that provide integration with other enterprise applications like order fulfillment systems or back office systems. The interface to these external software servers may be through some specified data message format, such as an XML schema.

As can be seen from the above description of a typical web site system, the complexity and number of software integration points for the overall system exposes the software to a number of risks that all could lead to the inability of the web site to perform its services correctly or within an acceptable period of time. Again, there is a need for a method for accurately testing such systems before they are placed into operation to prevent loss of customers or other harm to the business providing the web site service.

SUMMARY OF THE INVENTION

A time before which software must be rebooted can clearly be established after a failure occurs. However, when safety-critical applications are involved, extensive property damage or loss of life may result if a failure is allowed before reboot requirements are determined. Similarly, catastrophic failures of even non-safety-critical software systems may result in substantial financial harm or loss of customer goodwill. Accordingly, it is important to be able to analyze software degradation over time and to be able to predict how often to reboot software to reduce or even eliminate the potential for failure due to corrupted states in continuously operating software systems. Additionally, a method for designing systems which can operate properly while embedded control software is rebooting, thereby allowing a safety-critical application to "operate continuously" is also needed.

It is therefore a goal of the present invention to aid developers and testers in determining which portions of a "corrupted" state have a benign impact on the overall operation of the system and which portions cause catastrophic (i.e. hazardous) problems. A further goal of the present invention is to provide conservative (i.e. safe) software reboot metrics prior to software release, rather than waiting until accidents occur. Armed with such information, continuously operating software developers and testers can determine which internal software computations need additional integrity assurances before software is deployed. In one aspect of the present invention a method is provided for identification and placement of indicators that signal the need for software "rejuvenation."

The present invention tests state corruption through software fault injection. Software fault injection is a dynamic analysis that can be used to examine software internals to discover corrupted program states that force hazardous outputs to occur. The present invention utilizes software fault injection to provide a "what if" analysis, forcefully corrupting program states and allowing a tester to observe the results. A preferred embodiment of the present invention utilizes software fault injection to corrupt software states because corruption of a specific program state for a given software test execution can simulate a wide class of anomalous states and events, which may represent code mutations, error conditions at hardware or software interfaces, or even rare or unexpected input data. The present invention also utilizes software fault injection because internal state corruption instrumentation methods are presently more sophisticated than other testing techniques.

DETAILED DESCRIPTION OF THE INVENTION

For the purposes of the present invention, the term "feedback state" may refer to state information calculated from earlier control system software executions. The process of using information from previous executions on a current computation is handled by a feedback mechanism built into the software or device that the software controls. In addition to stored state information, the control software may be fed information from the environment into which the software is embedded.

As the control software continues to run, feedback states may become corrupted, and the present invention seeks to characterize the extent to which such corruption may affect continuously operating software and the systems the software controls. The present invention utilizes a technique known as fault injection to induce state corruption. Fault injection generally relies on two event class definitions. First, there are those events that will be forcefully injected into application software states during execution. These events are termed data anomalies. Examples of such data anomalies would include corrupting a pointer, modifying variable values, or slowing down a computation.

The second set of events are classes of functional behavior (i.e. output events) that an embedded software designer does not want the software to exhibit. Examples here include hazardous output states and calls to system-level utilities that embedded software should not make. These events are referred to as output anomalies. What constitutes an output anomaly must be defined with respect to the state of the system in which the software resides or which the software controls. For example, in safety-critical systems, output anomalies may include those outputs which cause hazards. In another example, for a web server system, output anomalies may include those outputs which severely impact performance of the server or otherwise the system to be inoperable.

Fault injection usually creates data anomalies using pseudo-random number generation. There are two general ways in which pseudo-random number generation is employed to corrupt program states. The first involves changing a stored value to a new value based on the original value. The second involves changing a stored value to something that is completely independent of the original value.

Figure 2:
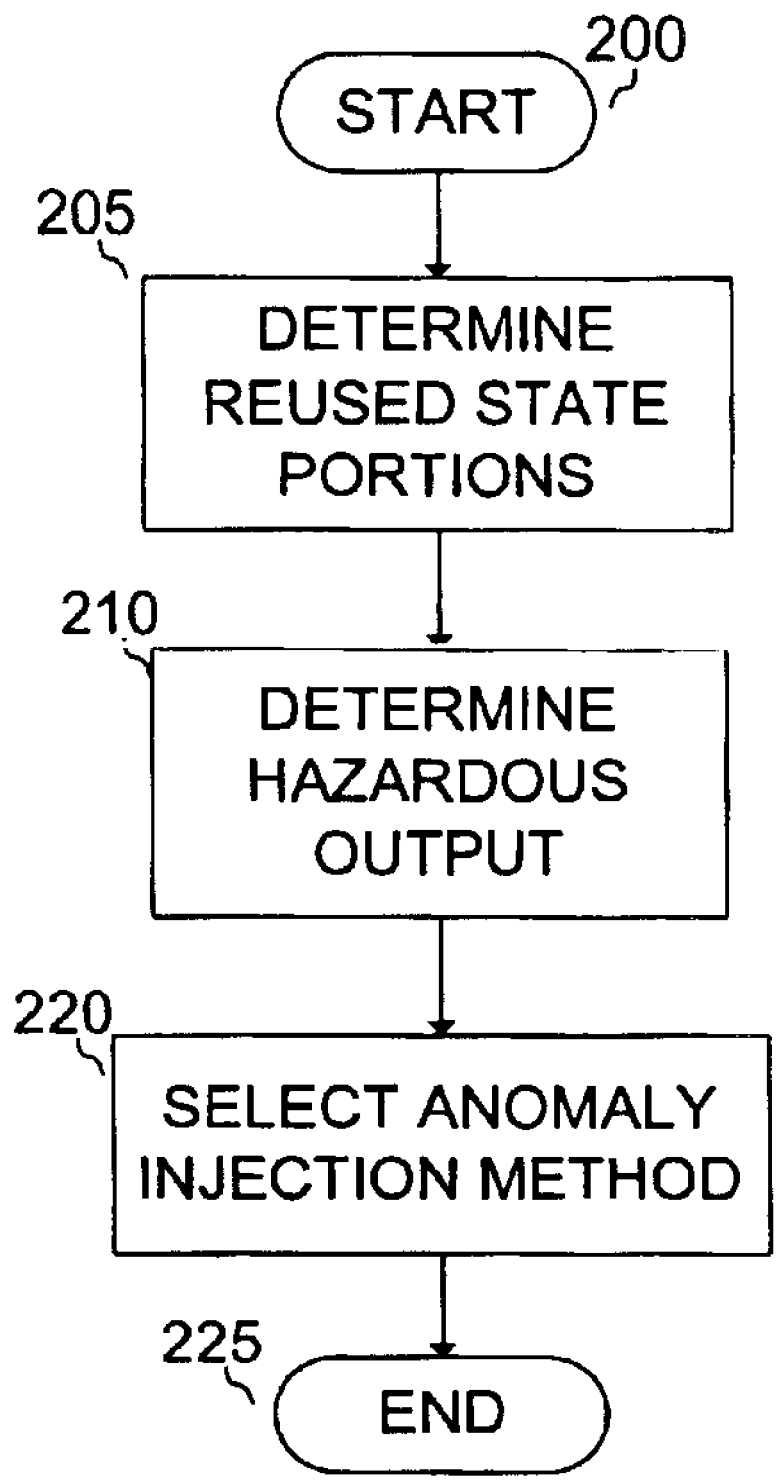
FIG. 2 is a flow diagram illustrating a procedure a tester may follow in carrying-out an embodiment of the present invention.

FIG. 2 is a flow diagram illustrating a procedure a tester may follow in carrying-out an embodiment of the present invention. The procedure starts at step 200. In step 205, the tester determines which state portions are fed back between control loop executions. Next, in step 210, the tester determines which external event classes the software should not output to the entity it controls. These unacceptable events are referred to as software-influenced hazards.

In step 220 the tester determines an appropriate means for analysis-based anomaly introduction. Such determination may consider for example, data anomaly types to be injected into the state, and when in software execution to perform data anomaly injection. For example, if it is reasonable to assume that the state will be corrupted on the first control loop iteration, then a data anomaly should be injected prior to the first iteration. However, a tester may also choose to wait until the software reaches a stable/steady state before injecting data anomalies. For example, it may be advantageous to wait until the thousandth execution, after the system has "warmed up," before injecting an anomaly. This procedure ends in step 225 and the tester may proceed to data collection and analysis according to the present invention as described below.

Figure 3:
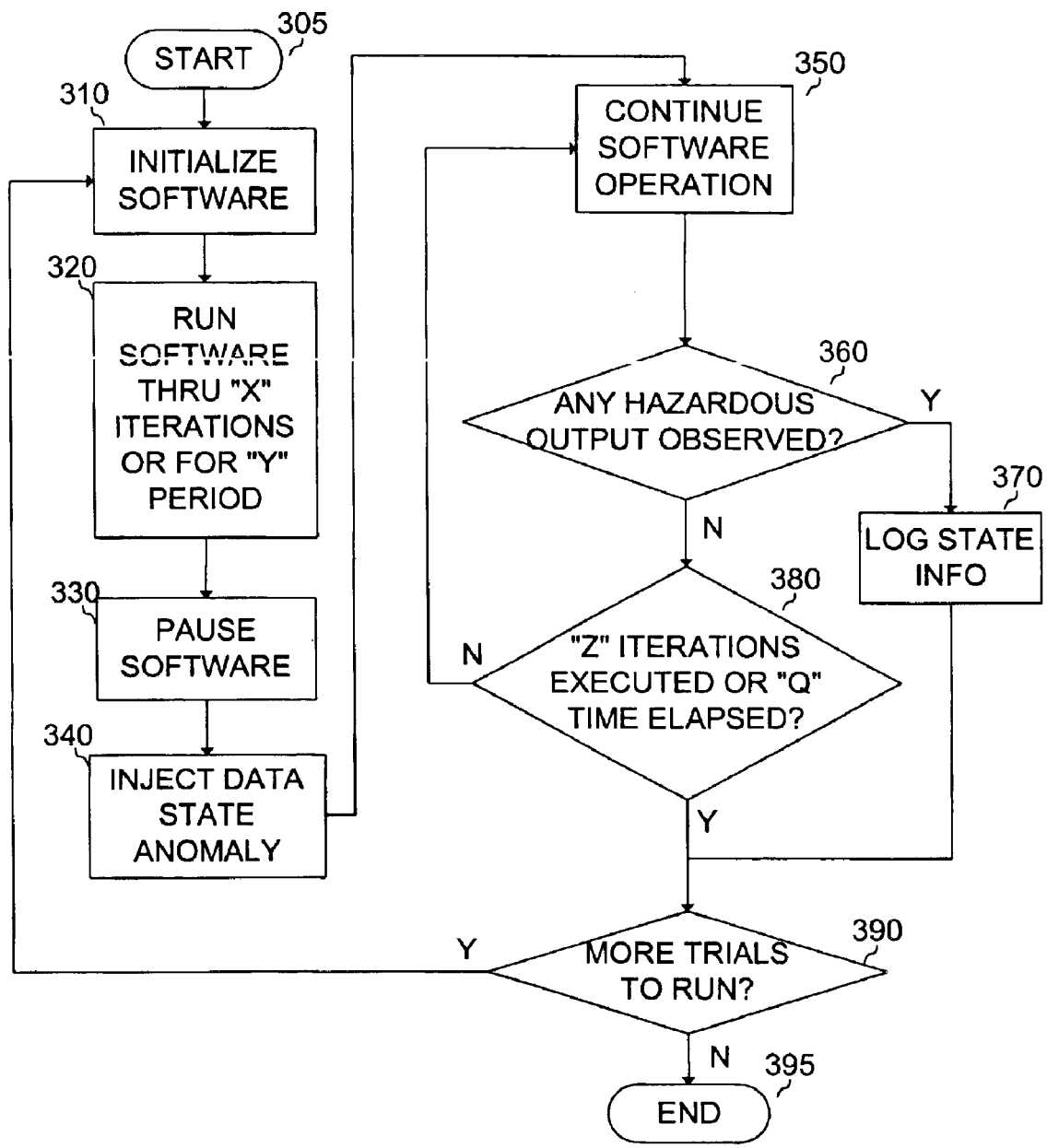
FIG. 3 is a flow diagram illustrating a procedure by which embedded software can be tested for hazardous conditions in an embodiment of the present invention.

FIG. 3 illustrates a general analytical approach used in an embodiment of the present invention. The process starts in step 305 as shown in FIG. 3. In step 310 the control software is initialized by configuring state information according to standard values (or "initial values.") This step may be accomplished by rebooting the software or by forcing any variables (i.e., state information) to their initial values. Analysis then proceeds to step 320 in which the embedded software is run until some number of predetermined iterations have been completed or some predetermined amount of time has passed. For example, the software may run through a control loop X times, where X may be a number greater than or equal to zero. For continuously operating software programs, it is often hard to distinguish a complete execution because it is unclear what constitutes a single, complete input vector. In such cases, a tester may choose to allow the software to run for a fixed interval of time, Y.

When a desired number of iterations are achieved or the pre-determined time interval has elapsed the software is paused in step 330. During this pause in operation, data state anomalies may be injected into the software environment. Preferably, only one type of anomaly is injected during this step thereby allowing further analysis of "cause-effect" relationship between the anomaly and the safe operation of the software. Once data state anomalies have been injected, the embedded software may be allowed to resume operation in step 350. In step 360, the tester observes program operation to identify state corruptions that present unsafe external outputs to the environment in which the embedded software resides. If any unsafe outputs are presented, the state information is written to a log file. Preferably, the log file contains information correlating the anomalous data state leading to the hazardous result, including, e.g., the number of iterations or the amount of time passed before observing the hazardous output, identification of the injected fault and the like.

If, in step 360, no hazardous outputs have been observed, the number of iterations or time elapsed is compared with some pre-determined number of iterations or time period to determine whether or not the trial has been successfully completed. If the trial is not yet completed, the process continues with steps 350 and 360 where the software continues operations and the tester watches for hazardous outputs. If the trial is successfully completed, or resulted in hazardous output prior to completion, the process moves on to step 390. In step 390, if there are additional trials to be run (e.g., additional data state anomalies are to be injected) the process returns to step 310 for initialization of the software as described above. Otherwise, the process stops in step 395.

Using data collected according to the present invention allows testers to predict how frequently the software should be rebooted to avoid the most damaging forms of "corrupted state" build-up. For example, if the software completed X+Z iterations, or has executed for a time equal to Y+Q, control system execution may be halted, and this information recorded for future use. Q and Z may be determined based on anticipated use data or other information, which can indicate approximately how often the system would be rebooted when in the field. Such determination may be made before the analysis was performed. For example, if it was originally anticipated that a system would require rebooting every 6 months, then a value for Q should be selected which is closer to 6 months than 5 minutes. This allows testing the viability of a 6 month estimate. By further applying techniques such as accelerated testing, results can be obtained that predict a very long period of time between reboots, from analysis performed within a much shorter period of time.

In an embodiment of the present invention an embedded software designer may further guard against hazardous external events by embedding assertions, or internal self-tests, in appropriate state portions to trap values which are known to produce hazardous outputs. Such assertions may be determined based on the results of the testing procedures described above. Including assertions can increase the dimensionality and/or cardinality of the software's output space by testing inputs prior to a calculation or calculation results, and identifying those which can indicate error conditions. Such assertions not only aid in characterizing the impact of state corruption during software testing, but can also be used after deployment. Internal assertions may be embedded in the state at various control loop analysis phases, thereby increasing overall system observability.

Embedding assertions into the control software allows software developers to embed corrective actions within the software. For example an assertion may be used to detect a known bad state that, if left uncorrected, would result in a hazardous output. Once the bad state is identified, an alarm can be raised that triggers a safe reboot of the system or other corrective actions can be programmed into the system.

Static data flow techniques may prove useful in selecting proper assertion embedding points. For efficiency, isolation of those variables which appear to create hazardous outcomes may be preferred. Likewise, late data flow isolation of state variables which a static analysis indicates depend on possibly corrupted state variables is preferred. For each selected state variable, an assertion can be provided to test for unacceptable values, or even to provide a simple watch mechanism.

After anomalous data has been introduced and the embedded software has resumed operation, assertion data should be monitored and recorded. In an embodiment of the present invention, only data which appears hazardous need be recorded. In an alternative embodiment, all assertion data may be stored, thereby allowing more detailed off-line analysis. Regardless of the embodiment chosen, records should also include a timestamp (T) for each record, and, where possible, a control loop iteration count.

Assertion data collected in the manner described above can also form the basis for self-tests which can be employed within a control sequence to warn before a hazard is likely to occur. In addition, repeated tests can be used to determine how frequently embedded software should be rebooted. Repeated testing also allows a plurality of anomalies to be injected, and thus provides a more reliable reboot frequency metric by allowing the injection of a variety of possible corruptions to different portions of the feedback state using different data anomalies.

Determining Safe Operating Duration

According to the present invention, an estimated "safe operating duration" (i.e., time period or number of iterations) can be determined. Once fault injection has been applied and results are collected, a sequence of times can be determined from the different trials, where each time represents either observation of a hazard or the trial timing out (i.e. no hazard had yet occurred). If Y and Q were constant for all trials, and if all recorded times equal Y+Q, then no hazards were observed. If however there exists a time in the sequence that is less than Y+Q, then that represents a trial on which an external hazard was produced. Let this value be $\gamma$.

A safe operating duration would then be the value $\gamma$. That is, the embedded software should be rebooted at most every $\gamma$ units of time. For example, if $\gamma=Y+Q$, then by rebooting every Y+Q units of time (or possibly at intervals slightly greater than Y+Q), state corruptions capable of causing hazards can be virtually eliminated within the feedback state. In an alternative embodiment, a more conservative estimate can be made if the value of $\gamma$ is cut in half, thereby increasing the reboot frequency by a factor of two, and further decreasing the likelihood of any hazards occurring due to a corrupted state.

In another embodiment of the present invention the tester may vary the number of control loop executions, X (or the time, Y), that elapse before an anomalous state is injected. In some implementations of the present invention, such variation may be advantageous as different portions of the state may be particularly sensitive at different intervals of the total software execution lifetime. For instance, corrupting a specific portion of the state after only a few passes through the execution loop may lead to hazards within a few more iterations of the execution loop. However, corrupting the same portion of state later in the execution of the program (for example, after the system has "warmed up") may not lead to any hazards at all or may lead to a hazard only after a significant length of execution time elapses.

During this analysis, it may be useful to record the length of additional time that the software can run safely after introduction of a corrupted portion of the state. Such data allows a tester to gain an understanding of how much longer the software may be allowed to run if a state corruption has occurred. Given a tester's estimate of the probability of state corruption over time, a tester can determine an optimal reboot frequency.

Figure 4:
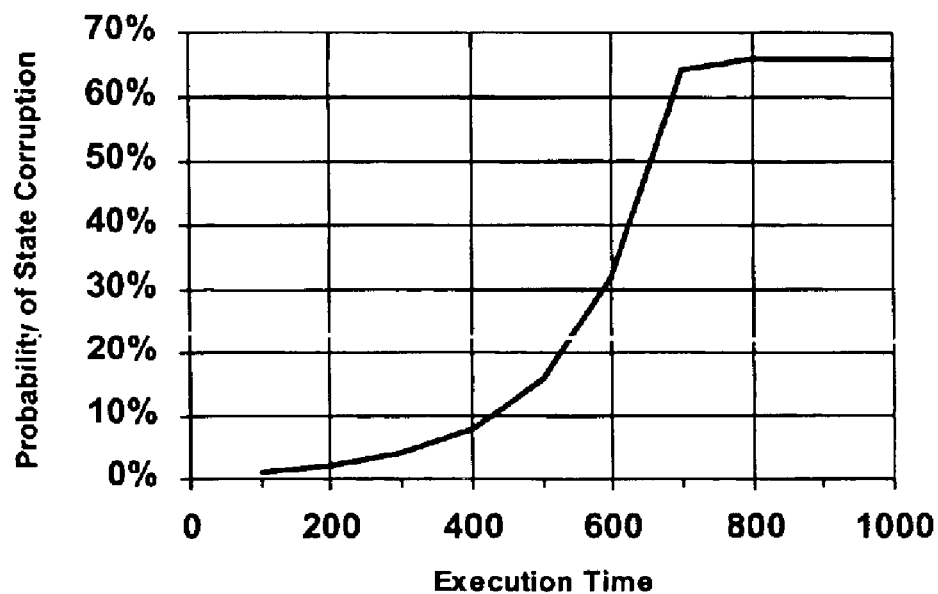
FIG. 4 is a graph illustrating the probability of state corruption versus time resulting from an implementation of the present invention.

For example, the graph in FIG. 4 represents how a the present invention can be used to estimate the probabilities of a state corruption as a function of software execution time. According to the data illustrated in FIG. 4, a tester has a greater than 50% confidence that a state corruption in the software tested will occur at somewhere between 600 and 700 units of operation (i.e. iterations of the control loop or time period elapsed).

Figure 5:
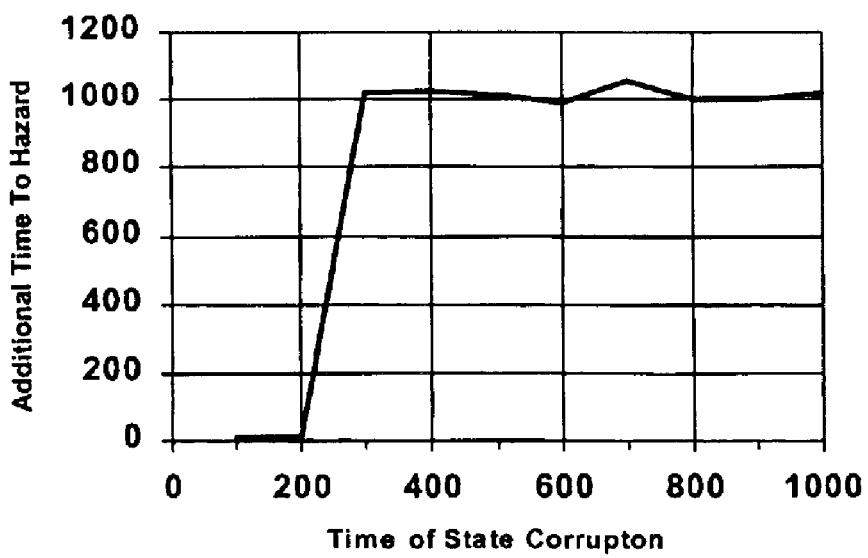
FIG. 5 is a graph illustrating the time after a state is corrupted before a hazard may occur as a function of state corruption time resulting from an implementation of the present invention.

If a tester performs analyses where the value of X (or Y) is varied, a graph such as that illustrated by FIG. 5 may be obtained. FIG. 5 illustrates the number of additional units of operation (on average) that the software may be run before a hazardous outcome occurs, for different state corruption times. FIG. 5 indicates that after a certain period of operation (about 300 units) the software is fairly tolerant of state corruptions, which do not propagate to hazardous outcomes until, on average, 1000 more units of operation have passed. This trend is consistent with software that has a warm-up period during the early portion of execution; once the software has reached a steady state, it is much more tolerant of state corruptions. Based on this data, a tester for this particular software may choose a reboot frequency in the neighborhood of 600 units (from FIG. 4)+1000 units=1600 units of operation.

Varying Location of Fault Injection

In another embodiment of the present invention, the general algorithm can be refined to apply to individual locations within the main execution loop of the software. At a given location, if a state variable gets defined (i.e. assigned a value), then we can easily introduce the corruption of the associated state variable by injecting a fault at this location.

Figure 6:
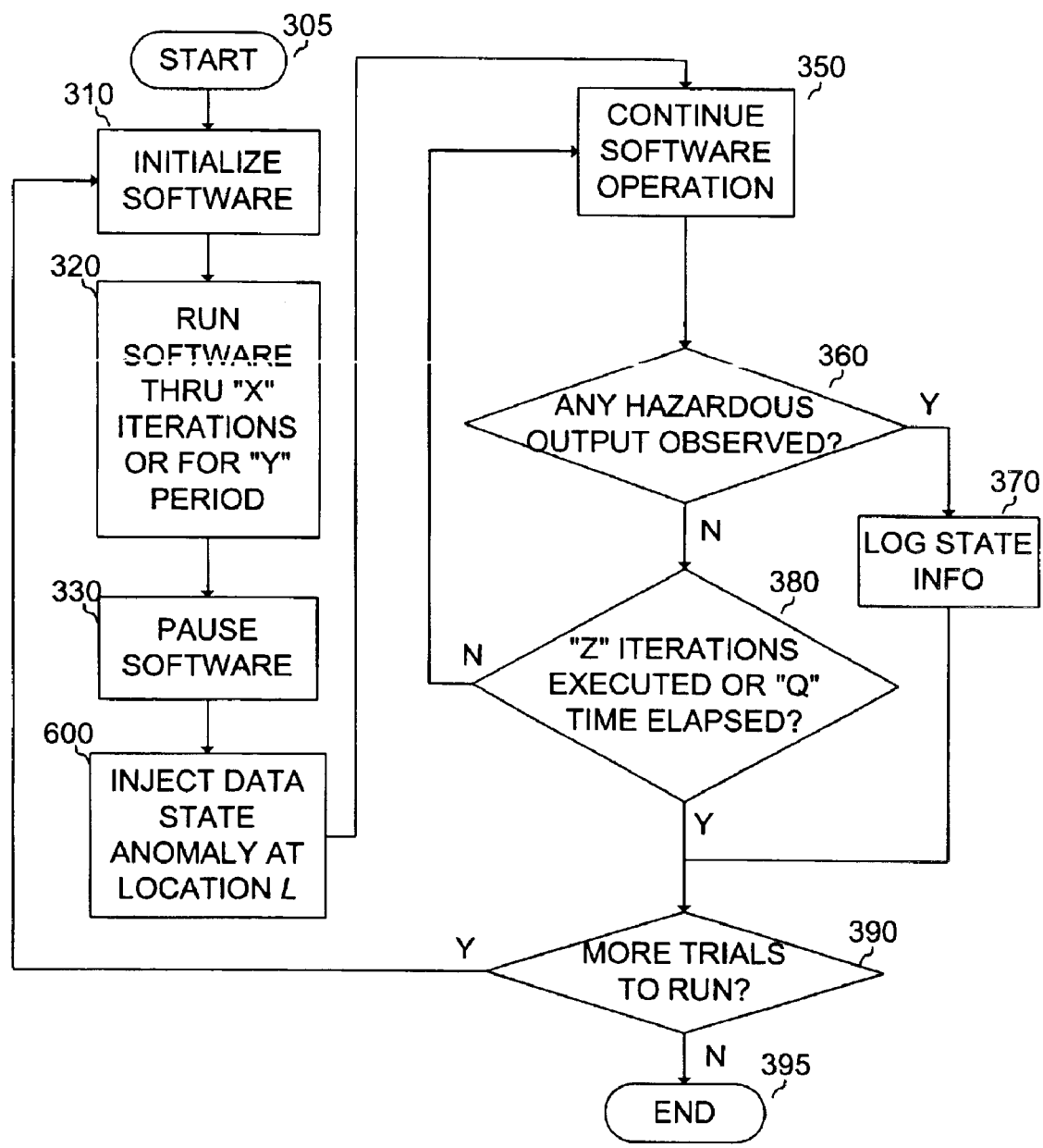
FIG. 6 is a flow diagram illustrating a procedure by which embedded software can be tested for hazardous conditions in an alternative embodiment of the present invention.

When injecting anomalous state data at specific locations, the analysis may be applied in a similar manner as proposed in the general algorithm. That is, after X executions (or after time Y), the state is corrupted at location L as shown in step 600 in FIG. 6. The remaining steps shown in FIG. 6 are the same as those similarly numbered steps shown FIG. 3. Following this state corruption, software execution is resumed and internal assertions are checked in an effort to detect resulting corruption in other portions of the state, and to check for hazardous outcomes. Fault injection can be performed for different values of X (or Y) as well as different anomalous data values at location L. The goal of the analysis is to understand whether the data corruptions at location L propagate over time to a hazardous outcome, and if so, how long it takes to propagate to the hazard.

If a tester finds a specific location where hazards are created within a short period of time after corruption, such a location may be significant in the causation of hazardous conditions, and closer inspection of the state variable defined at this location may be warranted. If a software fault exists at this location, such software can create a hazardous condition very quickly. Internal assertions may be applied at these locations to test for values which can predict impending hazards before hazards occur. That is, self-correction software can be if the assertion detects a fault in location L.

This location-based analysis can even be extended to include distributed fault simulation. State corruptions can be injected into the running software at multiple locations at a given iteration X (or time Y). The analysis can help determine whether distributed faults can lead to hazardous software output.

With well-placed internal assertions during analysis, a tester may discover that multiple state corruptions compound the impact on other parts of the state and accelerate the propagation to hazardous outcome. These other state portions can be treated with fault injection to assess the sensitivity of the reboot frequency to variations in these state variable values. Such investigations can lead to discovery of those state portions that should be monitored to prevent hazardous outcomes.

It is worth noting that the initial period Y should be carefully chosen. Although the analysis taught by the present invention allows extension beyond the time interval Y, it is important to have a high degree of confidence that the embedded software will maintain a relatively stable state and operate safely for the initial duration of time Y. Hazards occurring before Y indicate that a shorter value for Y should be chosen.

The analysis taught by the present invention allows extension beyond the time interval Y. Presented slightly differently, the analysis taught by the present invention allows a tester to determine the period of time, beyond the anticipated reboot frequency Y, after which the embedded software should be rebooted.

As previously discussed, fault injection analysis can provide detailed information on which portions of the feedback state, if corrupted, resulted in hazards. Also, fault injection can be implemented in a such a way as to catalog events occurring between anomaly injection and hazard occurrence. This information can be used to build assertions that sit on a shadow processor or are built into the embedded control software to warn when similar events occur after the software is deployed. Such assertions can then act as warning mechanisms.

As described in the Background of the Invention section above, many in the prior art have shied away from the use of assertions within embedded software because such software typically operates in environments that have scarce extra memory for programs which are bloated with instrumentation. In addition, the environment in which control software is embedded may not provide a channel by which information can be passed to a tester.

The present invention addresses both of these concerns by utilizing alternative techniques not previously applied to embedded software testing. The present invention addresses the issue of resource use by implementing on other machines those assertions which would otherwise be instrumented into the embedded software. The approach preferred by the present invention may be similar to techniques such as shadow processing.

However, shadow processing itself does not address the need for channels through which data may be passed. In a preferred embodiment, memory cells used by the software may be physically accessible to a shadow processor, such that a shadow processor may read directly from said memory. A configuration such as that described above allows a shadow processor to pull data from embedded software memory and execute assertions on such data. However, accurate data monitoring requires precise timing, and a shadow processor should be time-synchronized with the embedded software.

The present invention provides safe reboot metrics for safety-critical software prior to its release in the field. However, post-deployment, if the software continues to operate safely for greater and greater periods of time without incident, it is likely that the interval between reboots can continue to be safely increased. Although the present invention simulates conditions the software may experience in the field, field-proven operation is a more reliable indicator of software quality and robustness than laboratory testing alone. Field observations may thus be used to effectively improve upon original laboratory estimates for the initial time period Y. As previously stated, the proposed analysis can be used to gauge how much longer the deployed software may be left running, given its current safe operating duration in the field.

Reboot frequency metrics calculated in accordance with the present invention are designed to give users a feeling of how often to reboot safety-critical real-time systems to limit the propagation of corrupt data values. By placing assertions on certain portions of the feedback state, users can be warned when types of corruption have occurred that are likely to result in hazards. In addition, inclusion of internal assertions as described by the present invention provides an opportunity for other analyses that can study dynamic relationships among state variables.

As described above, the reboot frequency metric may be based on a number of control loop iterations or on execution time. As there are often difficulties determining exact iteration counts, a time-based metric may be preferred by some testers. Although both a time-based metric and a frequency based metric can be computed using the procedures set forth in this application, this application will focus primarily on time-based metrics. However, such focus should not be construed as limiting the present invention.

Other Applications of the Present Invention

Figure 1A:
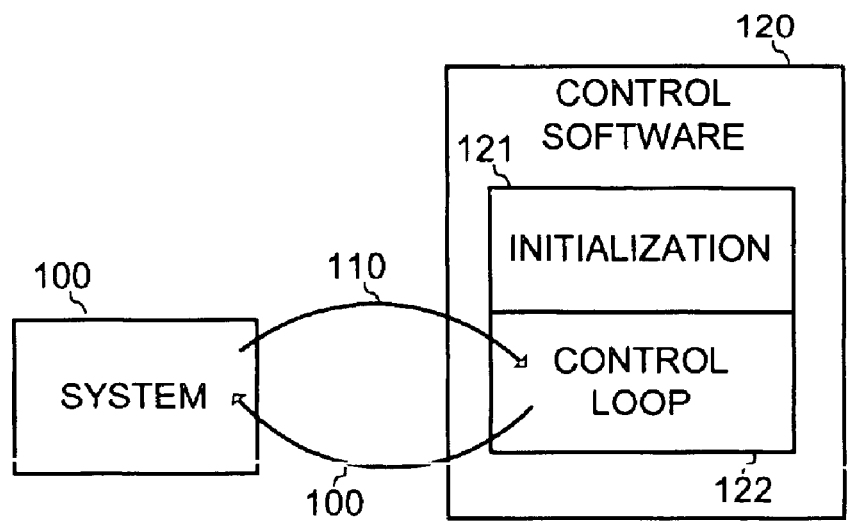
FIG. 1A is a block diagram illustrating a traditional control system in an embedded software system.
Figure 1B:
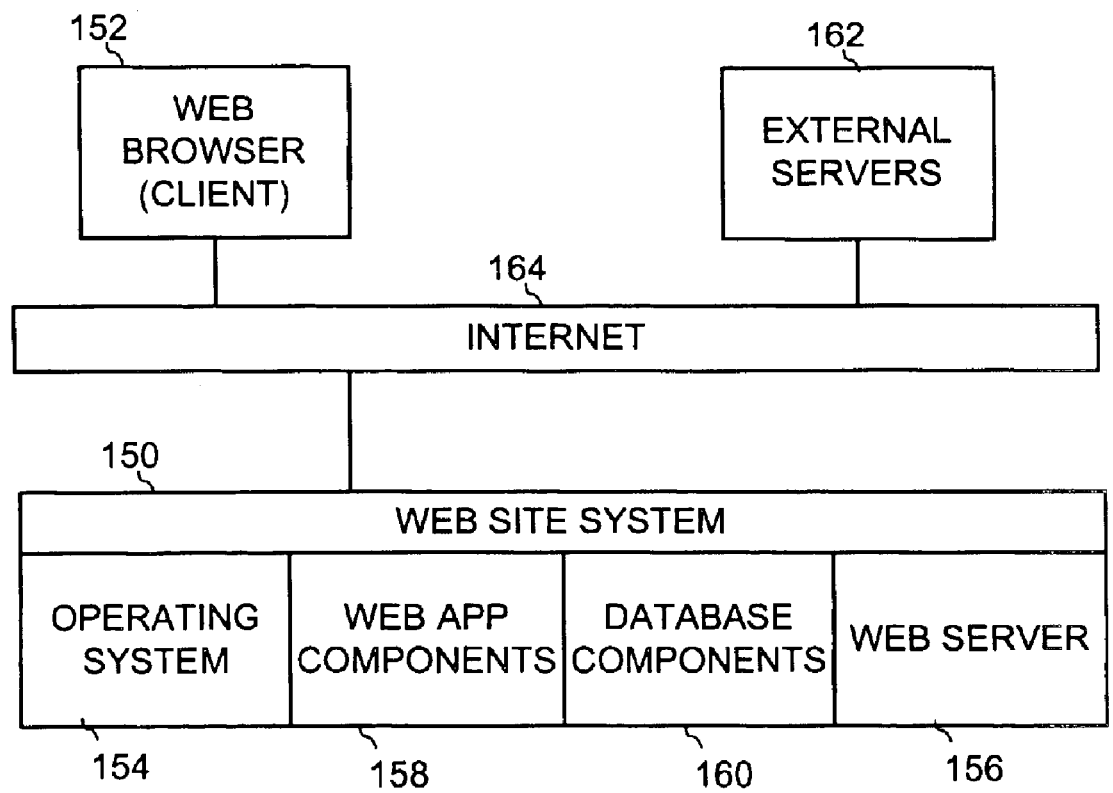
FIG. 1B is a block diagram illustrating a continuously operating software system providing web services.

As described above, the problems associated with embedded control software systems often arise in other continuously operating software systems. Accordingly, a the present invention, as described above, may be implemented for any software system that is intended for continuous operations. For example a web site System such as shown in FIG. 1B may be tested according to the steps described herein to uncover the types of anomalous data or events that cause failure (unacceptable outputs) in the system, including failures that render the entire site unavailable or severely degrade its performance.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for estimating a safe operating period for a continuously running software system, said method comprising the steps of:

initializing the software system, the software system having inserted therein an assertion;

running the software system for a first pre-determined period;

pausing the software system;

injecting a first data state anomaly into the software system;

running the software system after the data state anomaly has been injected;

with the assertion, trapping values that are known to produce hazardous outputs;

checking for an unacceptable output from the software system;

stopping the software system and logging the unacceptable output if an unacceptable output is observed; and stopping the software system if a second pre-determined period has elapsed without an unacceptable behavior being observed.

2. The method of claim 1, further comprising repeating each of the steps using a second data state anomaly, said second data state anomaly different than the first data state anomaly.

3. The method of claim 2, wherein the first pre-determined period is changed prior to repeating the steps.

4. The method of claim 1, wherein the first and second pre-determined periods comprise time periods.

5. The method of claim 1, wherein the first and second pre-determined periods comprise iterations of the software system.

6. The method of claim 1, wherein the step of logging the hazardous output comprises writing a plurality of information to a log file.

7. The method of claim 6, wherein the plurality of information comprises a time stamp.

8. The method of claim 6, wherein the plurality of information comprises an iteration count.

9. The method of claim 6, wherein the plurality of information comprises the first data state anomaly.

10. The method of claim 6, wherein the plurality of information comprises a time stamp and the first data state anomaly.

11. The method of claim 6, wherein the plurality of information comprises an iteration count and the first data state anomaly.

12. The method of claim 6, further comprising the step of analyzing the plurality of information in the log file to determine a safe operating period for the continuously operating software system.

13. The method of claim 1, further comprising setting the safe operating period to a period that is substantially the sum of the first and second pre-determined periods.

* * * * *